A. G. SÉBILLOT.
Apparatus for the Recovery of Waste Sulphuric Acid
No. 230,501. Patented July 27, 1880.

WITNESSES:
C. Neveux
C. Sedgwick

INVENTOR:
A. G. Sébillot
BY Munn & Co
ATTORNEYS.

A. G. SÉBILLOT.
Apparatus for the Recovery of Waste Sulphuric Acid.
No. 230,501. Patented July 27, 1880.

WITNESSES:
C. Neveux
E. Sedgwick

INVENTOR:
A. G. Sébillot
BY Munn & Co.
ATTORNEYS.

UNITED STATES PATENT OFFICE.

AMÉDÉE G. SÉBILLOT, OF PARIS, FRANCE, ASSIGNOR TO JAMES KINGON AND FRANCIS A. KIEFFER, OF NEW YORK, N. Y.

APPARATUS FOR THE RECOVERY OF WASTE SULPHURIC ACID.

SPECIFICATION forming part of Letters Patent No. 230,501, dated July 27, 1880.

Application filed February 7, 1880. Patented in France June 19, 1879.

*To all whom it may concern:*

Be it known that I, AMÉDÉE GABRIEL SÉ-BILLOT, of Paris, France, have invented a new and Improved Apparatus for the Recovery of Waste Sulphuric Acid, of which the following is a specification.

The object of the invention is to improve the product obtained from treating argentiferous ores, as well as to save the acid used in the process.

The invention, for which I have received Letters Patent in France, No. 131,302, dated June 19, 1879, consists of a furnace in which the ore, which has been saturated with sulphuric acid, is roasted, the superfluous acid being distilled by the action of the heat and then condensed in some suitable condensing apparatus adjoining the furnace. The sulphurous acid is conducted into a regenerator filled with pumice-stone or similar stone, and having currents of air, steam, and sulphurous acid, produced by a small adjoining furnace, conducted into it, in which generator fresh sulphuric acid is produced.

Figure 1:
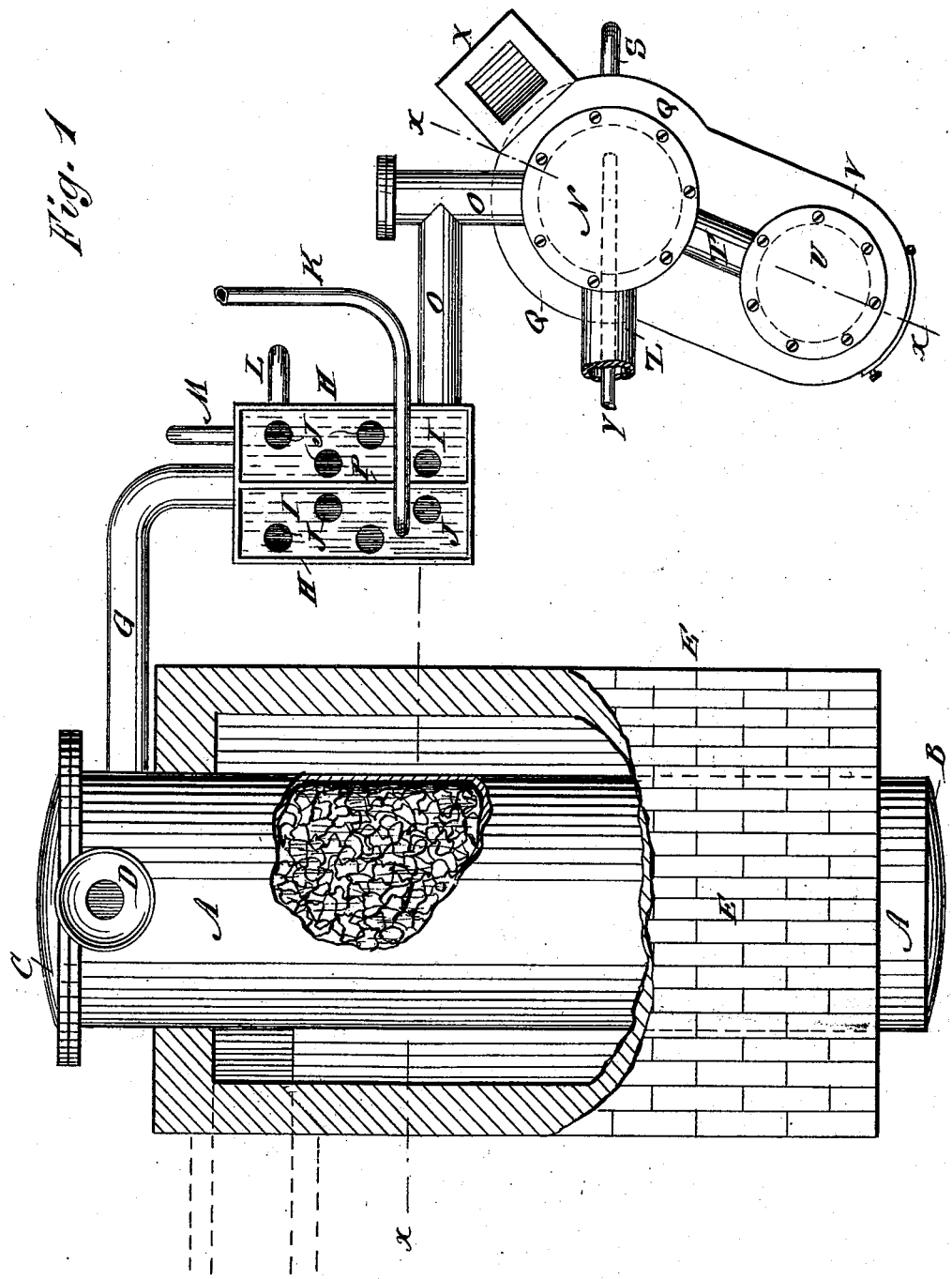
Figure 2:
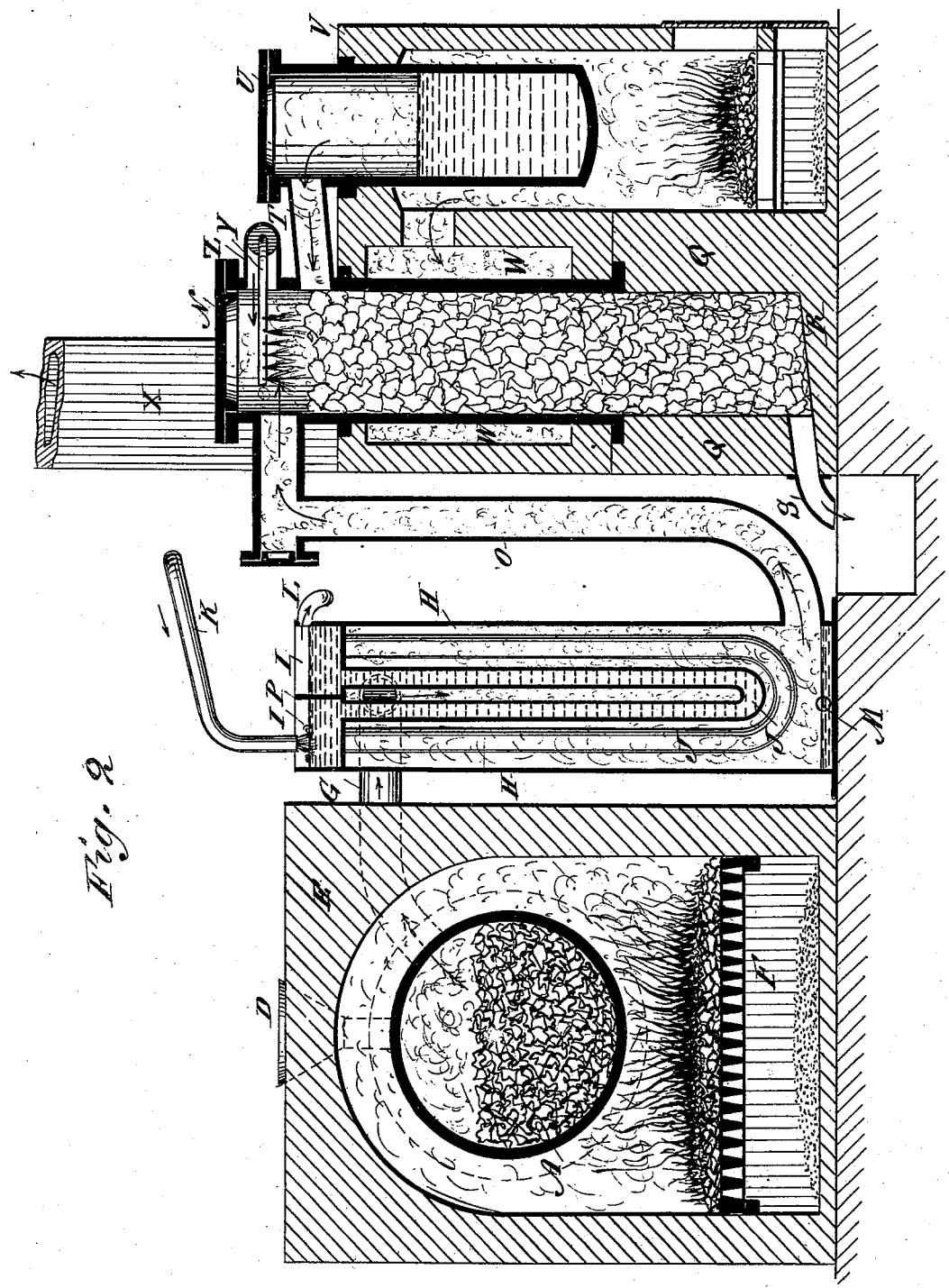

In the accompanying drawings, Figure 1 represents a plan view of my improved furnace and the apparatus for reproducing the acid. Fig. 2 represents a cross-sectional elevation of the same on the line $x$ $x$, Fig. 1.

Similar letters of reference indicate corresponding parts.

A cast-iron cylinder, A, provided with a fixed head, B, a detachable head, C, and a funnel, D, rests on the end walls of a furnace, E, provided with a grate, F, or with some suitable device for conducting the waste heat from the roasting-furnaces to the cylinder A. The cylinder A may be replaced by a muffle, a cast cupola, such as used in manufacturing soda, or by some other suitable device. A tube, G, leads from the retort or cylinder A to a condensing-chamber, H, made of or lined with lead and provided with a tank, I, with a central partition, P, from which tank U-shaped lead tubes J extend downward, and which has water conducted into it by the pipe K and carried off by the pipe L.

The U-shaped tubes J may be replaced by spiral tubes or some other similar device.

The chamber H is provided with an outlet, M, at the bottom, and is connected with the cast-iron bell N by the tube O. The bell can be made of any other suitable material, and is surrounded by a tower, Q, of mason-work, which forms the continuation of the bell, and has an inclined bottom, R, and an outlet, S.

By means of the tube T the bell N is connected with a closed cylindrical vessel or retort, U, contained in a vertical furnace, V, adjoining the tower Q, and so arranged in relation to the same that the products of combustion of the furnace V circulate through the annular flue W, surrounding the bell N, and then pass off through the smoke-stack X. A pipe, Y, provided with numerous perforations near the end, leads steam from a boiler into the bell N, and a tube, Z, furnishes a current of air. The bell N and the lower part of the tower Q are filled with pieces of pumice-stone, quartz, or some other material that is not affected by the acid. The tower Q and the bell N may be of a greater or less height, as may be desired. The furnace E is provided with a chimney, as indicated in dotted lines. When the works require a large amount of sulphuric acid the bell must be replaced by cast-iron pipes heated and a chamber of lead.

The operation is as follows: If the ore contains considerable quantities of galena, arsenic, and antimony, they must be roasted, before being further operated with, for the purpose of eliminating as much of the arsenic and antimony as possible by volatilization, and transforming the galena into oxides and sulphates. The ore, which has been roasted, or may be in its natural state, as may be necessary, is then saturated with concentrated sulphuric acid and passed into the retort or cylinder A through the funnel D, and the cylinder is heated, either by the fire on the grate F, by the waste heat of the roasting-ovens, or by some other suitable means. This causes the transformation of the silver into a sulphate and the disengagement of sulphurous acid and the formation of sulphuric-acid vapor. However, there must always be a great excess of sulphuric acid above the amount required to transform all the bases and metallic substances which accompany the silver into sulphates. The sulphurous acid that is disengaged and the sulphuric acid that is evaporated by the distilling of the saturated ore pass through the tube G into the chamber H, where the sulphuric acid circulates and is condensed by coming in contact with the cool surfaces of the U-shaped or other pipes, J.

The water enters the tank I on the top of the chamber H at one side of the partition P, then passes through the U-shaped tubes J into the compartment on the other side of the partition, and then flows off through the outlet L, but does not come into contact with the sulphuric acid, but only cools the surfaces of the pipes J, extending into the space filled by the sulphuric-acid fumes.

The condensed sulphuric acid collects in the bottom of the chamber H, and can be drawn off through the outlet M. The sulphurous acid passes through the condensing-chamber H into the tube O, and from there into the regenerator N. The pieces of stone in the regenerator are kept at a white heat by the action of the heat from the furnace V circulating in the annular flue W.

A quantity of sulphur or pyrites is heated or burned in the retort or vessel U, and the sulphurous acid thus produced is conducted into the bell N by the tube T, where it mingles with the sulphurous acid coming from the retort A through the pipe O. Steam is conducted into the bell N by the tube Y, and air by the tube Z.

By the action of the heated stones in the tower and bell and the currents of steam and air the sulphurous acid is transformed into sulphuric acid in the upper part of the regenerator, which acid condenses in the lower part of said regenerator.

Having thus described my invention, I claim as new and desire to secure by Letters Patent—

1. In an apparatus for recovering sulphuric acid in the treatment of ores, the combination, with a furnace and retort for heating the ore, of a condensing apparatus and a regenerator provided with a furnace and connecting-flues, for transforming the sulphurous into sulphuric acid, as described.

2. The combination, with the ore-retort A and its furnace, of the condenser H, the regenerator N, with its connecting-flue and furnace, and the retort U, as and for the purpose specified.

The above specification of my invention signed by me this 9th day of January, 1880.

AMÉDÉE GABRIEL SÉBILLOT.

Witnesses:
ROBT. M. HOOPER,
EUGENE HÉBERT.